(12) United States Patent
Coutier et al.

(10) Patent No.: US 10,071,621 B2
(45) Date of Patent: Sep. 11, 2018

(54) AUTOMOTIVE EQUIPMENT FOR EQUIPPING AN AUTOMOTIVE SET AND AN AUTOMOTIVE SET COMPRISING SUCH AN AUTOMOTIVE EQUIPMENT

(71) Applicant: MGI COUTIER ESPANA SL, Pontevedra (ES)

(72) Inventors: André Coutier, Champfromier (FR); Philippe Billerot, Villeneuve-les-Avignon (FR); Julio Garcia Rodriguez, Pontevedra (ES); Jose Oscar Vazquez Carballo, Vigo-Pontevedra (ES); Delmiro Javier Couto Maquieira, Pontevedra (ES); Alberto Diez Estevez, Vigo (ES)

(73) Assignee: MGI COUTIER ESPANA SL, Pontevedra (ES)

( * ) Notice: Subject to any disclaimer, the term of this patent is extended or adjusted under 35 U.S.C. 154(b) by 39 days.

(21) Appl. No.: 15/257,516

(22) Filed: Sep. 6, 2016

(65) Prior Publication Data
US 2017/0066312 A1    Mar. 9, 2017

(30) Foreign Application Priority Data
Sep. 3, 2015    (FR) ...................... 15 58169

(51) Int. Cl.
| | |
|---|---|
| *B60J 9/00* | (2006.01) |
| *B60J 5/04* | (2006.01) |
| *E05B 79/06* | (2014.01) |
| *E05B 81/76* | (2014.01) |
| *E05B 85/10* | (2014.01) |
| *E05B 17/06* | (2006.01) |

(52) U.S. Cl.
CPC ............... *B60J 9/00* (2013.01); *B60J 5/0418* (2013.01); *B60J 5/0468* (2013.01); *E05B 17/06* (2013.01); *E05B 79/06* (2013.01); *E05B 81/76* (2013.01); *E05B 85/10* (2013.01)

(58) Field of Classification Search
CPC .......... B60J 9/00; B60J 5/0418; B60J 5/0468; E05B 17/06; E05B 79/06; E05B 81/76; E05B 85/10
See application file for complete search history.

(56) References Cited

U.S. PATENT DOCUMENTS

| | | |
|---|---|---|
| 4,875,726 A | 10/1989 | Thau |
| 5,336,174 A | 8/1994 | Daoud et al. |

(Continued)

FOREIGN PATENT DOCUMENTS

| | | |
|---|---|---|
| CA | 1332620 C | 10/1994 |
| WO | 2004-043722 A2 | 5/2004 |

*Primary Examiner* — D Glenn Dayoan
*Assistant Examiner* — Melissa A Black
(74) *Attorney, Agent, or Firm* — Oliff PLC (57) ABSTRACT

This automotive equipment includes: a central component intended to close an opening of a peripheral component with a peripheral clearance, a positioning member having centering elements, the positioning member is removably linked to the central component. The positioning member is arranged so that the centering elements extend at least partially in projection with respect to the central component. Each centering element is deformable so that the centering elements can cooperate with edges of the opening so as to center the central component with respect to the opening.

19 Claims, 6 Drawing Sheets

(56) References Cited

U.S. PATENT DOCUMENTS 5,340,174 A     8/1994   Bender et al.
2006/0282987 A1*   12/2006   Shih .................... B60Q 1/2669
                                                                                 16/412

* cited by examiner

AUTOMOTIVE EQUIPMENT FOR EQUIPPING AN AUTOMOTIVE SET AND AN AUTOMOTIVE SET COMPRISING SUCH AN AUTOMOTIVE EQUIPMENT

The present invention concerns an automotive equipment for equipping a motor vehicle.

The present invention is applied to the field of automotive equipments and the assembly of automotive components, in particular automotive components having a portion visible from the outside of the motor vehicle. By motor vehicle, are meant, in particular, passenger vehicles, commercial vehicles, agricultural machines or industrial vehicles for example of the truck-type.

U.S. Pat. No. 5,340,174A describes an automotive equipment, in this instance an external opening control. This automotive equipment comprises a central component, herein an actuating lever and a positioning member which are mounted on a peripheral component defining an opening. In the automotive equipment of U.S. Pat. No. 5,336,174A, the central component and the peripheral component have oblong slots in which fastening screws pass.

However, an automotive equipment of the state of the art requires an adjustment of the clearances which is time-consuming. Furthermore, it is difficult to obtain a constant clearance, along the perimeter of the opening, between the automotive equipment and the opening executed in the body panel. In addition, the central component, which is a visible portion, might be damaged during the assembly or during the shipping.

The present invention aims in particular to solve all or part of the aforementioned problems.

For this purpose, an object of the present invention is an automotive equipment, for equipping an automotive set which includes a peripheral component defining an opening, the automotive equipment being characterized in that it comprises at least:

a central component intended to close at least partially the opening with a peripheral clearance between the central component and the peripheral component, a positioning member having an outer perimeter and centering elements arranged on the outer perimeter, the positioning member being configured to be removably linked to the central component, the positioning member being arranged so that the centering elements extend at least partially in projection with respect to the central component, each centering element being deformable so that the centering elements can cooperate with edges of the opening so as to center the central component with respect to the opening.

Since the centering elements extend in projection with respect to the central component, the centering elements are apparent when the automotive equipment is in the assembled state. The thus exposed centering elements can cooperate, by surface contact, with the edges of the opening when the operator places the automotive equipment on the peripheral component.

Thus, such an automotive equipment allows, thanks to the positioning member, centering the central component with respect to the opening automatically, that is to say without adjustment by the operator. For example, this centering allows obtaining a constant peripheral clearance between the central component and the peripheral component. After having removed the removable positioning member, the centering, in particular the constant peripheral clearance, offers an aspect as streamlined as possible between the central component and the opening, which confers a great visual quality to this portion of the motor vehicle. Hence, an operator can form the automotive set by placing the automotive equipment on the peripheral component, without caring about adjusting the peripheral clearance around the central component, because the centering elements themselves carry out this centering.

When the automotive set is in the assembled configuration, the peripheral clearance between the central component and the peripheral component is mastered depending on the distribution intended in the specifications established by the automobile manufacturer who assembles the motor vehicle. Indeed, since the centering elements are deformable, they can cooperate by interference with the peripheral component.

The positioning member holds by adhesion on the central component before its mounting on the automotive set. Thus, the manufacturer of the automotive equipment can deliver an assembled automotive equipment to the automobile manufacturer.

Afterwards, the automobile manufacturer installs the automotive equipment on the peripheral component, which forms a fixed reference part. When the operator introduces the central component provided with the positioning member through the opening executed in the peripheral component, the centering elements are deformed, which induces reactive forces which are substantially perpendicular to the edges of the opening.

Considering the shapes and the materials of the centering elements, these reactive forces tend to center the central component with respect to the opening, and therefore with respect to the peripheral component. In addition, after this mounting of the automotive equipment on the peripheral component, the positioning member is maintained in place on the central component in a removable manner, for example when the centering elements are deformed as they have been compressed by the edges of the opening.

Thus, the deformation of the centering elements of the positioning member allows, during the assembly of the automotive equipment on the peripheral component, centering the central component with respect to the peripheral component, by distributing the peripheral clearance between them in a mastered and aesthetic manner. The distribution of the peripheral clearance may be predetermined during the design of the automotive equipment based on the general shape of the opening and on the aesthetic aspect desired by the automobile manufacturer.

To this end, the thickness and the magnitude of deformation of each centering element are selected based on the pursued peripheral clearance. In addition, the sizing and the selection of the materials composing the positioning member, in particular the centering elements, may take into account the mass of the automotive equipment and/or the kinematics of mounting of the automotive equipment.

For example, the automotive equipment may be an external opening control, in which the central component forms a handle; the peripheral component may be a door panel. In this example, the centering elements allow centering the handle with respect to the opening in the door panel, while ensuring a rapid mounting of the external opening control by an operator from the inner side of the door.

According to one variant, the positioning member and its centering elements are composed of at least one material selected in the group constituted of a slightly rigid thermoplastic, an elastomeric thermoplastic or an elastomer.

According to one variant, the centering elements are disposed on an outer perimeter of the positioning member, the outer perimeter extending at least partially in projection with respect to the central component.

According to one variant, the outer perimeter has generally the shape of a hollow prism section, for example with a rectangular base.

Moreover, when in-service, the positioning member can ensure a protection of the central component against scratches and impacts, when the positioning member is configured to cover at least partially this central component. Indeed, when the positioning member is maintained on the central component, the covering portion covers all or part of the opening, therefore all or part of the outer surface of the central component.

According to one embodiment, each centering element has a thickness strictly larger than 100% of a predetermined minimum peripheral clearance between the central component and the opening.

Thus, each centering element can cooperate by interference with an edge of the opening, when the thickness of the centering elements is larger than the minimum peripheral clearance between the opening and the central component.

Indeed, in the case of a minimum clearance, in order to limit the pulling effort for extracting the positioning member from the opening, the thickness of the centering elements may be selected larger than the minimum clearance but smaller than or equal to the maximum clearance.

According to one variant, each centering element has a thickness strictly larger than 100% of a predetermined maximum peripheral clearance between the central component and the opening.

The minimum and maximum peripheral clearances are predetermined from the chain of dimensions defining the dimensions of the parts.

According to one embodiment, the centering elements comprise at least one elastically deformable centering element.

Thus, the or each elastically deformable centering element allows distributing in a mastered and aesthetic way, for example uniformly, the peripheral clearance between the central component and the peripheral component when the automotive equipment is mounted on the peripheral component. Indeed, such a centering element may be more or less deformed so as to more or less compensate the peripheral clearance.

According to one variant, the centering elements comprise several centering elements which are elastically deformable. In particular, all the centering elements may be elastically deformable.

According to one variant, the centering elements comprise at least one plastically deformable centering element, for example several plastically deformable centering elements. Thus, the or each plastically deformable centering element allows uniformly distributing the peripheral clearance between the central component and the peripheral component when the automotive equipment is mounted on the peripheral component.

According to one variant, at least one elastically deformable centering element is plastically deformable.

According to one embodiment, the centering elements are selected in the group constituted of beads, blades, legs and corrugations.

In other words, such centering elements form deformable protrusions on the positioning member.

Thus, such centering elements allow inducing a peripheral clearance, while remaining simple to manufacture. Indeed, such centering elements may be integral, in other words monolithic, with the other portions of the positioning member. For example, the positioning member and its centering elements may be produced by injection molding.

According to one variant, the centering elements comprise elements made of cellular foam, elastomer or elastomeric thermoplastic, the centering elements being affixed, for example by bonding, on the perimeter of the positioning member.

According to one embodiment, the centering elements comprise at least one slightly deformable abutment which is arranged so that the peripheral clearance between the central component and the peripheral component is larger than a predetermined minimum clearance.

The magnitude of deformation of the slightly deformable abutment is smaller than the magnitude of deformation of either one of the centering element. Thus, such an abutment allows guaranteeing a minimum clearance.

According to one embodiment, at least one part of the centering elements comprises holding portions configured to removably link the positioning member to the central component.

Thus, such holding portions allow placing the positioning member on the central component in service position, in which the positioning member allows distributing the peripheral clearances along the perimeter of the opening.

According to one variant, on each centering element that comprises a holding portion, the holding portion is located opposite to the portion of the centering element which is configured to cooperate with the edges of the opening. In other words, each centering element thus formed has a face configured for maintenance on the central component and an opposite face configured to cooperate with one of the edges of the opening.

In the variant where the centering elements are formed by material corrugations, a corrugation ridge may cooperate with an edge of the opening, whereas a corrugation trough ensures maintenance of the positioning member on the central component.

According to one embodiment, the positioning member comprises at least one pulling member configured to enable pulling the positioning member.

Thus, such a pulling member allows pulling and detaching the positioning member from the automotive equipment, generally just before the presentation of the motor vehicle to the final customer.

According to one embodiment, the pulling member has at least one pulling orifice intended to receive a pulling tool, for example a hook.

Thus, such a pulling orifice allows easily detaching the positioning member from the automotive equipment, which is useful when there are significant frictions between the positioning member and the peripheral component, therefore when the automotive set is in the assembled state.

According to one embodiment, the positioning member comprises guide members, each guide member having a shape inclined towards the outer perimeter so that the guide members have substantially converging shapes, each guide member extending substantially up to the outer perimeter.

Thus, these guide members allow facilitating the introduction of the positioning member in the opening when the operator mounts the automotive equipment on the automotive set, which is useful when the operator has to install the positioning member «blindly», that is to say from a non-visible side towards a visible side of the motor vehicle. In addition, such guide members allow avoiding any risk of error during the assembly of the automotive equipment. Indeed, such guide members achieve a foolproofing function.

In particular, when the automotive equipment is an external opening control, therefore when the central component is a handle, and when the peripheral component is a body panel, for example of a door, the guide members allow rapidly mounting the external opening control, therefore the handle, which has to be mounted from the inside towards the outside of the door.

According to one embodiment, the automotive equipment further comprises a gasket, at least one of the centering elements being configured to cooperate with an inner edge of the gasket so as to center the gasket with respect to the central component.

Thus, such a gasket allows ensuring a sealing between the central component and the peripheral component or between the support of the central component and the peripheral component, when the automotive equipment is mounted on the peripheral component. Besides the sealing, the gasket may have the function of hiding irregularities on the peripheral component, for example on a flanged edge of a sheet metal forming a body panel, in order to improve the aspect.

Moreover, the positioning member may also have the function of centering another automotive component, for example a trim, located on the outer perimeter, whether during the manufacture of this other automotive component, or during the assembly of this other automotive component on the automotive set.

According to one variant, several of the centering elements are configured to cooperate with the inner edge of the gasket so as to center the gasket with respect to the central component.

In addition, at least one of the centering elements is configured to cooperate with the inner edge of the gasket so as to center the gasket with respect to the opening.

According to one variant, the gasket further comprises abutments configured to position the gasket with respect to the peripheral component when the automotive equipment is mounted on the peripheral component. Thus, such abutments allow positioning the gasket on the peripheral component. The abutments may be arranged so as to position the gasket with respect to the peripheral component along a lateral direction (the axis Y of the motor vehicle).

According to one variant, each abutment belongs to the rigid portion.

According to one variant, the abutments may comprise lugs arranged on the inner edge of the gasket. Thus, such lugs or gadroons allow the gasket to abut against the peripheral component when the automotive equipment is mounted on the peripheral component.

According to one embodiment, the gasket comprises a rigid portion and a flexible portion, the flexible portion defining an inner edge of the gasket, the gasket being configured to surround at least partially the central component, at least one centering element being configured to cooperate with the inner edge of the gasket so as to center the gasket with respect to the central component.

According to one variant, the gasket comprises at least: i) a first material and ii) a second material, the rigid portion being composed by the first material and the flexible portion being composed by the second material. In other words, the gasket is a bi-material gasket. Such a gasket may be produced by bi-material injection of plastic and thermoplastic-elastomer materials, by injecting the first material and the second material successively or simultaneously.

Alternatively, the gasket may be mono-material, therefore formed of one single material. In this variant, the rigid portion may be composed of relatively thick elements, whereas the flexible portion may be composed of relatively thin elements.

According to one variant, the first material and the second material are compatible, in particular chemically compatible. For example, the first material may be a polypropylene (PP) and the second material may be a thermoplastic-elastomer, for example, a polypropylene filled with an ethylene-propylene-diene-monomer (EPDM).

According to one embodiment, the positioning member comprises a covering portion configured to cover at least one peripheral portion of the central component.

Thus, such a covering portion allows protecting the central component against external impacts and/or scratches, thereby preserving the aspect of the central component intact until the presentation of the motor vehicle to the final customer.

Alternatively, the positioning member may be removed in manufacturer's plant, after assembling and fastening the automotive equipment on the automotive set. This protective function, ensured by the positioning member, is particularly useful, in particular, if the central component presents a shiny visible external surface.

According to one variant, the covering portion is configured to completely cover the central component.

According to one embodiment, the covering portion comprises a planar covering portion, and at least one portion of said centering elements extends in projection transversely, for example perpendicularly, to the planar covering portion.

Thus, such a planar covering portion allows forming a compact positioning member.

According to one variant, each centering element extends transversely, for example perpendicularly, to the planar covering portion.

According to one embodiment, the covering portion is arranged so as to completely cover the opening.

Thus, when in-service, the positioning member can completely protect the central component against external impacts or scratches, thereby keeping the aspect of the central component intact until the presentation of the motor vehicle to the final customer.

According to one embodiment, the covering portion is arranged so as to partially cover the opening, the positioning member presenting a window configured to allow an external observer to see a portion of the central component through the window.

Thus, an operator can inspect the central component, for example in order to check whether its color is compliant, with respect to the color selected for the body. Indeed, the covering portion uncovers partly the central component.

According to one embodiment, the covering portion is translucent or transparent.

Thus, an operator can inspect the central component, for example in order to check whether its color is compliant, with respect to color selected for the body. Indeed, the operator sees through the covering portion, because the covering portion is translucent or transparent.

According to one embodiment, the positioning member has at least one breakable portion intended to be cut, for example manually or with a cutting tool, so as to clear an access to the central component.

Thus, such a breakable portion allows accessing the central component when the automotive equipment is in-service on the automotive set. If appropriate, cutting this breakable portion allows actuating a central component if this breakable portion blocks a motion of the central component. The rest of the positioning member, with the exception of the breakable portion, continues protecting the central component after the assembly and until the presentation to the final customer.

According to one variant, the positioning member has two breakable portions which are arranged on two opposite sides of the positioning member.

According to one variant, the automotive equipment is selected in the group constituted of a movable portion, a door external opening control, a door internal opening control, an energy or fuel flap, a shutter, a decorative element, a door or any other equipment requiring an adjustment of the apparent clearances on the edge of this equipment during the assembly of an automotive set.

When the central component is a handle belonging to a door external opening control, the central component may comprise at least one handle trim (visible portion), which is secured to a handle body. Alternatively, the handle trim may be integral with the handle body.

According to one variant, the door external opening control may be arranged flush with a door panel with a predetermined flushing clearance with respect to a door panel.

According to one embodiment, the automotive equipment further comprises a body, the body being configured for the gripping of the automotive equipment by an operator.

Thus, such a body allows housing functional members of the automotive equipment. For example, when the automotive equipment is an external opening control, the mechanical and/or electrical members of the external opening control may be housed in the body.

Moreover, an object of the present invention is an automotive set, for composing a motor vehicle, the automotive set including a peripheral component defining an opening, the automotive set further including at least one automotive equipment according to the invention, the automotive equipment being mounted on the peripheral component.

the central component closing at least partially the opening with a peripheral clearance between the central component and the peripheral component, the centering elements cooperating with edges of the opening so as to center the central component with respect to the opening.

Thus, such an automotive set may offer an aspect as streamlined as possible between the central component and the opening, which confers a great visual quality to this portion of the motor vehicle.

An assembly method for forming the automotive equipment comprises the following steps, carried out at the manufacturer of the automotive equipment:

an operator provides at least the central component and the positioning member, the operator sets the positioning member in place on the central component, so that the positioning member is maintained on the central component in a removable manner, for example by adhesion of the deformed centering elements.

if appropriate, the operator then assembles another component, for example a gasket, this other component being accurately and automatically centered with respect to the central component thanks to the positioning member.

After having carried out these steps, the automotive equipment is delivered to the automobile manufacturer. The automobile manufacturer provides the peripheral component, which forms a fixed reference part, for example a body panel, in order to mount therein the automotive equipment, for example an external opening control. At the manufacturer of the motor vehicle, an operator sets the automotive equipment on the peripheral component by introducing the central component through the opening. Thus, the automotive set passes into the assembled state by any fastening type.

The central component is still protected by the positioning member. Finally, the positioning member is detached from the automotive equipment, either at the automobile manufacturer or at the dealer just before the presentation of the motor vehicle to the final customer.

The embodiments and the variants mentioned hereinbefore may be considered separately or according to any technically possible combination.

The present invention will be better understood and its advantages will appear in the light of the description that will follow, given only as a non-limiting example and made with reference to the appended schematic figures, in which identical reference numerals correspond to structurally and/or functionally identical or similar elements. In the appended schematic figures.

FIGS. 1 to 11, in particular 8 to 11, illustrate an automotive equipment 100 for equipping an automotive set 1, which is visible in FIGS. 9, 11, and 15 or 24.

Figure 1:
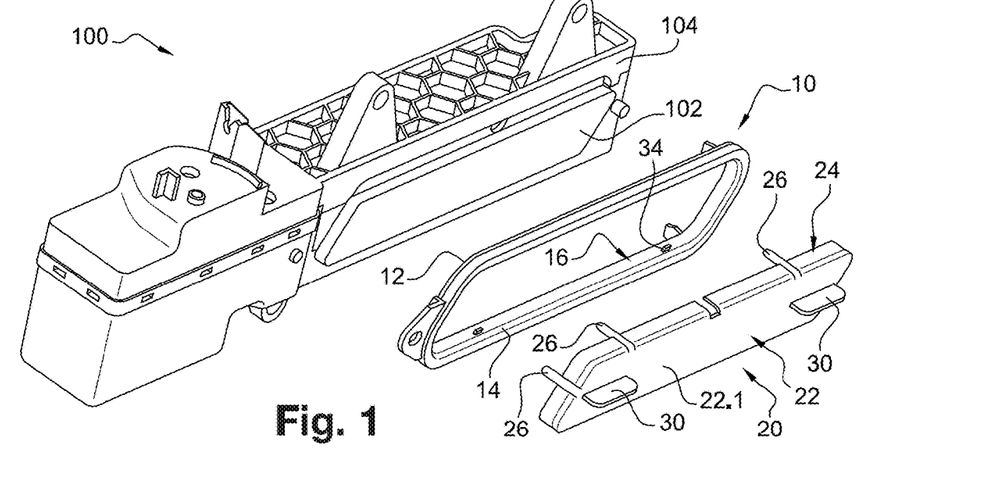
FIG. 1 is an exploded perspective view of an automotive equipment in accordance with a first embodiment of the invention.
Figure 2:
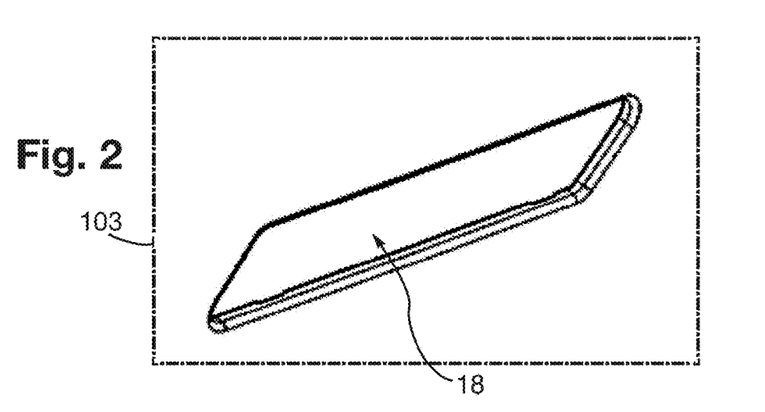
FIG. 2 is a perspective view, from the outside of a motor vehicle, of a peripheral component belonging to an automotive set in accordance with the invention.
Figure 3:
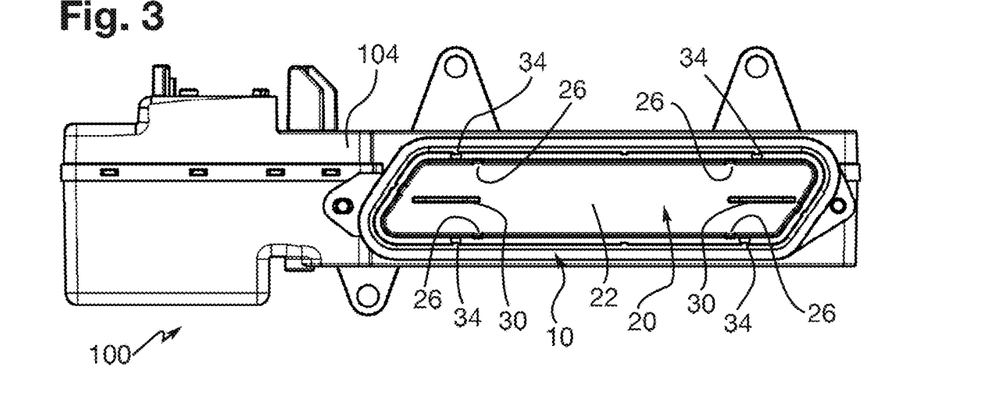
FIG. 3 is a front view of the automotive equipment of FIG. 1 in the assembled state.
Figures 4, 5:
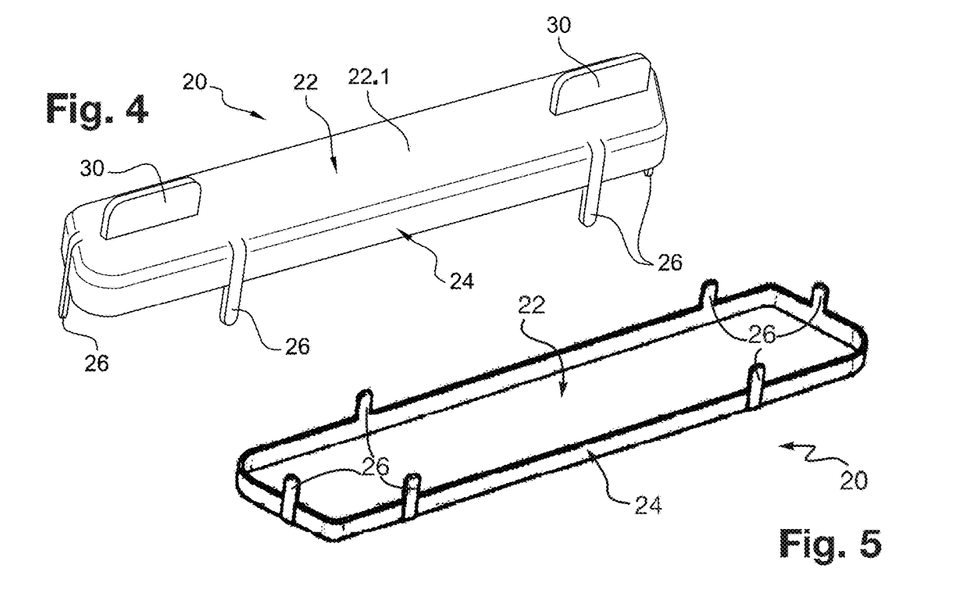
FIG. 4 is a perspective view of the outer side of a positioning member belonging to the automotive equipment of FIG. 1.
FIG. 5 is a perspective view of the inner side of the positioning member of FIG. 4.
Figures 6, 7:
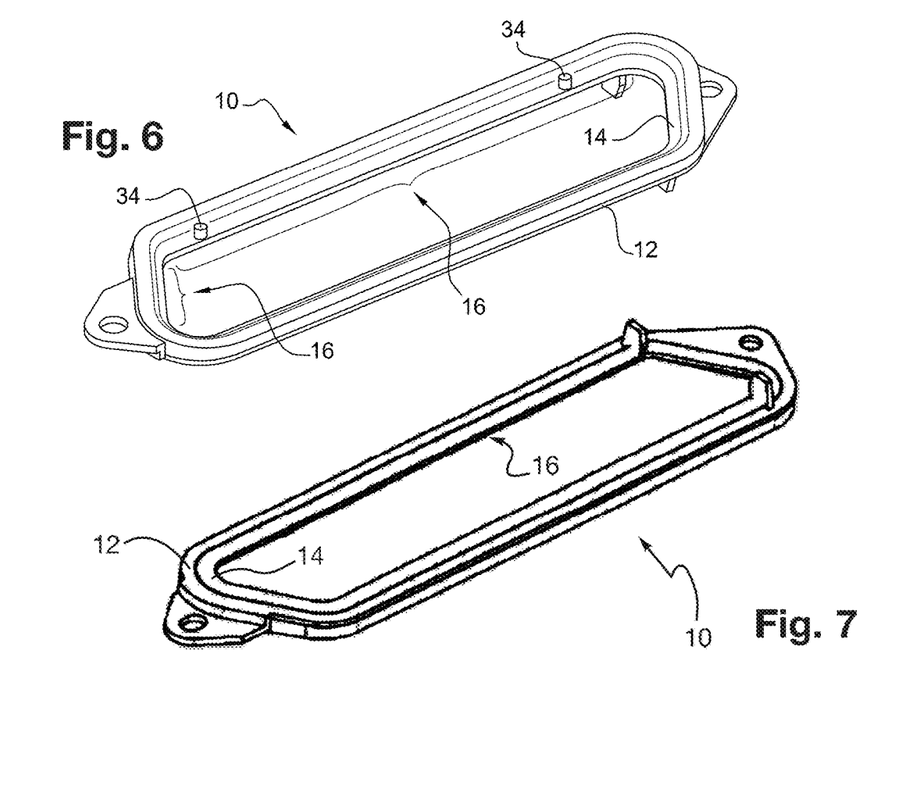
FIG. 6 is a perspective view of the outer side of a gasket belonging to the automotive equipment of FIG. 1.
FIG. 7 is a perspective view of the inner side of the gasket of FIG. 6.

The automotive set 1 comprises the automotive equipment 100 and a peripheral component 103, as shown in FIG. 2. The automotive equipment 100 comprises a central component 102 and a positioning member 20. Furthermore, the automotive equipment 100 comprises a body 104, which herein contains a door-opening mechanism.

Figures 8, 9, 10, 11:
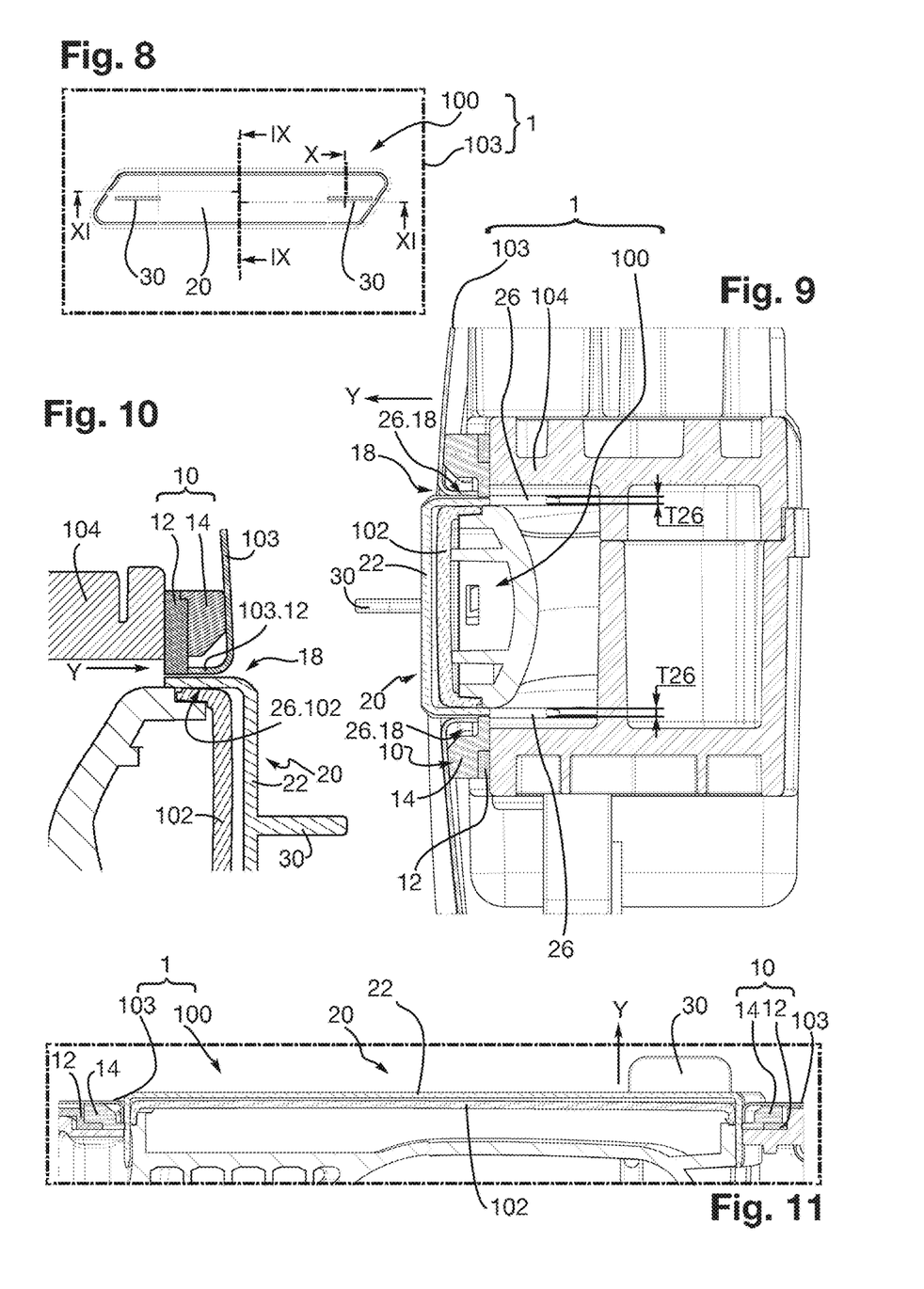
FIG. 8 is a front view of the outer side of an automotive set in accordance with the invention and comprising the automotive equipment of FIG. 1 installed on the peripheral component of FIG. 2.
FIG. 9 is a section along the line IX-IX in FIG. 8.
FIG. 10 is a section along the line X in FIG. 8.
FIG. 11 is a section along the line XI-XI in FIG. 8.

In the example of the figures, the automotive equipment 100 is formed by a door external opening control, the central component 102 of which forms a handle. The peripheral component 103 herein is a sheet metal door panel. The handle comprises a handle trim which should flush with the peripheral component 103, as shown in FIGS. 9, 10 and 11.

The peripheral component 103 defines an opening 18. The central component 102 is arranged so as to close the opening 18, a peripheral clearance being present between the central component 102 and the peripheral component 103 when the automotive equipment 100 is placed on the peripheral component 103 to form the automotive set 1.

Figure 15:
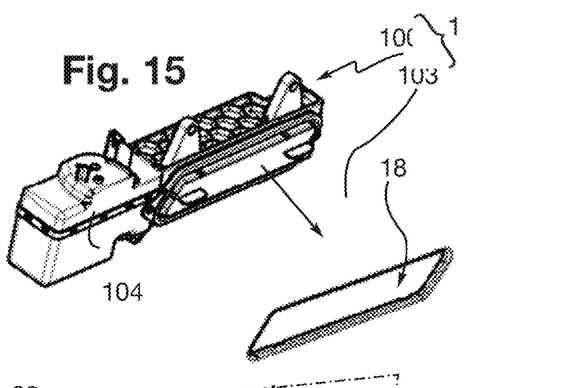
FIG. 15 is a perspective view illustrating a subsequent step of the assembly method illustrated in FIGS. 12 to 14.
Figure 16:
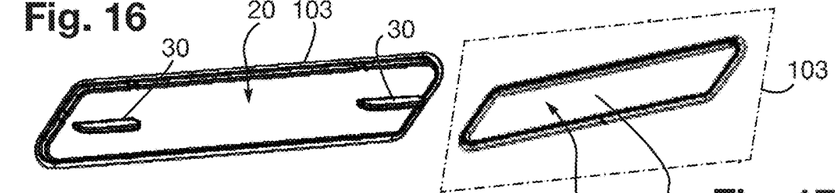
FIG. 16 is a front perspective view illustrating a subsequent step of the assembly method illustrated in FIGS. 12 to 15.
Figure 17:
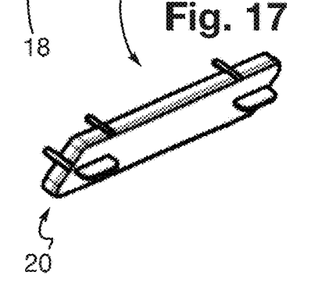
FIG. 17 is a perspective view illustrating a step involved after the assembly method illustrated in FIGS. 12 to 16.

The automotive equipment 100 further comprises a positioning member 20 having an outer perimeter 24. The outer perimeter 24 herein has generally the shape of a hollow prism section with a rectangular base. As shown in FIG. 15, the outer perimeter 24 extends partially in projection with respect to the central component 102 when the positioning member is in service position on the central component 102.

In the example of FIGS. 1 to 11, the positioning member 20 has in particular the function of positioning the central component 102 with respect to the peripheral component 103. In order to achieve this function, the positioning member 20 has centering elements 26 which are arranged on the outer perimeter 24. The centering elements 26 herein are arranged so as to cooperate with the central component 102.

As shown in FIGS. 9 to 11, each centering element 26 has:
a first face which interferes with the flanged edge 103.12 of the opening 18 at an interface 26.18 visible in FIG. 9, and
opposite to this first face, a face 26.102 (FIG. 10) which is pressed against the central component 102; the contact between each face 26.102 and the central component 102 ensures the removable maintenance of the positioning member 20 on the central component 102.

In addition, when the automotive equipment 100 is placed on the peripheral component 103, the centering elements 26 cooperate by surface contact with edges of the opening 18 at the interface 26.18 visible in FIG. 9.

Each centering element 26 herein is formed by a centering leg. Each centering element 26 is deformable, in this instance elastically, so that the centering elements 26 can center the central component 102 with respect to the opening 18 defined by the peripheral component 103 when the automotive equipment 100 is placed on the peripheral component 103.

Each centering element 26 herein has a thickness T26, materialized in FIG. 9, which is equal to 120% of a predetermined maximum peripheral clearance between the central component 102 and the opening 18. Each centering element 26 herein is composed of an elastomeric thermoplastic.

In addition, the automotive equipment 100 comprises a gasket 10. The gasket 10 comprises a rigid portion 12 and a flexible portion 14. The flexible portion 14 defines an inner edge 16 of the gasket 10. The gasket 10 has generally the shape of the opening 18. The opening 18 herein is sized so as to completely surround the central component 102. The outline of the opening 18 herein is formed by a flanged edge 103.12 (for example formed by folding) of the sheet metal door panel forming the peripheral component 103.

In the example of FIGS. 1 to 11, several of the centering elements 26 are configured to cooperate with an inner edge 16 of the gasket 10 so as to center the gasket 10 with respect to the central component 102. In other words, when the centering elements 26 cooperate by interference with the inner edge 16 of the gasket 10, the gasket 10 is centered with respect to the central component 102 and to the opening 18.

The gasket 10 herein is fastened to the body 104, for example by bonding, so as to ensure sealing between the peripheral component 103 and the body 104 when the automotive equipment 100 is placed on the peripheral component 103.

In the example of the figures, the gasket 10 is bi-material, that is to say it comprises: i) a first material and ii) a second material. The rigid portion 12 is composed by the first material and the flexible portion 14 is composed by the second material.

The positioning member 20 herein comprises a covering portion 22 which is configured to completely cover the opening 18. The covering portion 22 herein comprises a planar covering portion 22.1. The planar covering portion 22.1 is joined to the outer perimeter 24. In the example of the figures, each centering element 26 extends in projection perpendicularly to the planar covering portion 22.1. The covering portion 22 herein is translucent.

Moreover, the positioning member 20 herein comprises two pulling members 30 which are configured to allow pulling the positioning member 20, in order to detach the positioning member 20 from the peripheral component 103.

As shown in FIG. 10, the gasket 10 comprises abutments 34 which are configured to position the gasket 10 with respect to the peripheral component 103 when the automotive equipment 100 is mounted on the peripheral component 103. The abutments 34 herein comprise lugs arranged on the inner edge 16 of the gasket.

The abutments 34 herein are arranged so as to position the gasket 10 with respect to the peripheral component 103 along a lateral direction Y (the axis Y of the motor vehicle) when mounting the automotive equipment 100 on the automotive set 1. During this mounting, each abutment 34 abuts on a flanged edge 103.12 of the door panel which forms the peripheral component 103.

In the example of the figures, the central component 102 is movable relative to the peripheral component 103 when the automotive set 1 is in the assembled state. When the automotive equipment 100 is in-service, the central component 102 appears through the opening 18 delimited by the peripheral component 103.

Figures 12, 13:
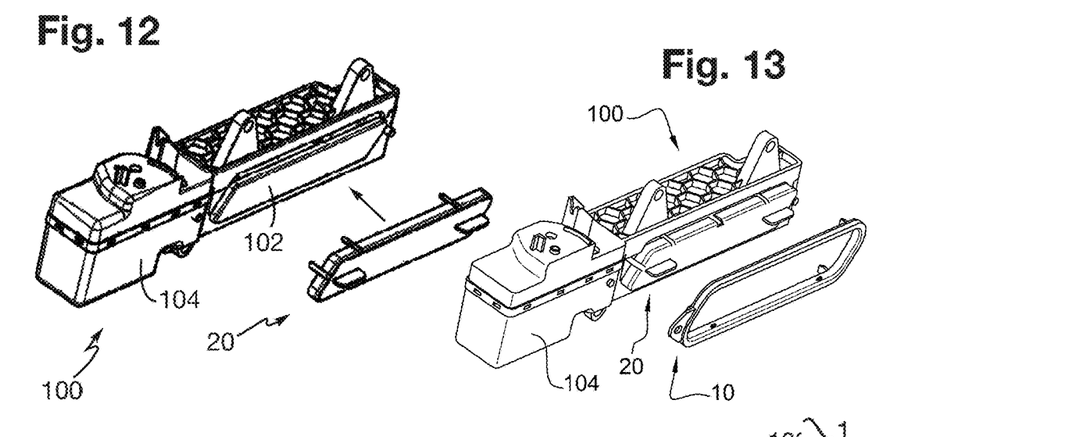
FIG. 12 is a perspective view illustrating a step of an assembly method implementing the automotive equipment of FIG. 1.
FIG. 13 is a perspective view illustrating a subsequent step of the assembly method.
Figure 14:
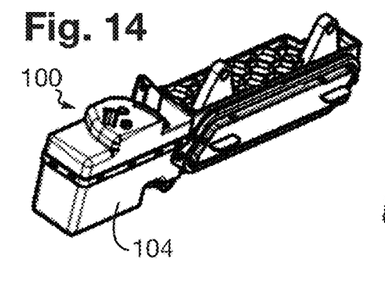
FIG. 14 is a perspective view illustrating a subsequent step of the assembly method illustrated in FIGS. 12 to 13.

FIGS. 12 to 18 illustrate an assembly method, for forming the automotive set 1. The steps illustrated in FIGS. 12 to 14 are carried out by an operator at the manufacturer of the automotive equipment 100, whereas the steps illustrated in FIGS. 15 to 18 are carried out by another operator at the manufacturer of the motor vehicle. This assembly method comprises the steps:

(FIG. 12) at the manufacturer of the automotive equipment 100, an operator provides the central component 102 and the positioning member 20, (FIGS. 13 and 14) at the manufacturer of the automotive equipment 100, the operator sets the positioning member 20 in place on the central component 102, so that the positioning member is maintained on the central component 102 in a removable manner, for example by adhesion of the centering elements 26, (FIGS. 13 and 14) at the manufacturer of the automotive equipment 100, it is possible to mount the gasket 10 on the body 104, the centering elements 26 centering the gasket 10 with respect to the positioning member 20.

The centering elements 26 cooperate with the central component 102 so as to maintain the positioning member 20 on the central component 102 in a removable manner. Thus, the positioning member 20 can hold by adhesion on the central component 102 before mounting of the automotive set 1. After these first mounting steps (FIGS. 12 to 14), the manufacturer of the automotive equipment 100 can deliver the automotive equipment 10 to the automobile manufacturer.

In order to assemble the automotive set 1, the automobile manufacturer provides the peripheral component 103, herein a door panel, in order to mount therein the automotive equipment 100, herein a door external opening control.

Afterwards, at the automobile manufacturer, another operator installs the automotive equipment 100 on the peripheral component 103.

When the operator introduces the central component 102 equipped with the positioning member 20 through the opening 18 made in the peripheral component 103 (FIG. 15), the centering elements 26 are deformed, which induces reactive forces which extend perpendicularly to the edges of the opening 18.

Considering the shapes and the materials of the centering elements 26, these reactive forces tend to center the central component 102 with respect to the opening 18, and therefore with respect to the peripheral component 103. In addition, after the mounting of the automotive equipment 100 on the peripheral component 103, the positioning member 20 is maintained in place on the central component 102, because the centering elements 26 are deformed as they have been compressed by the edges of the opening 18.

During the step of mounting the automotive equipment 100 on the peripheral component 103, the central component 102 is still protected by the positioning member 20.

Finally, the positioning member 20 is detached from the automotive equipment 100, whether at the automobile manufacturer or at the dealer just before the presentation of the motor vehicle to the final customer.

As shown in FIGS. 9, 10 and 11, when the automotive set 1 is in the assembled state, the centering elements 26 cooperate with the perimeter of the opening 18 so as to center the central component 102 in the opening 18, therefore with respect to the peripheral component 103.

Figure 18:
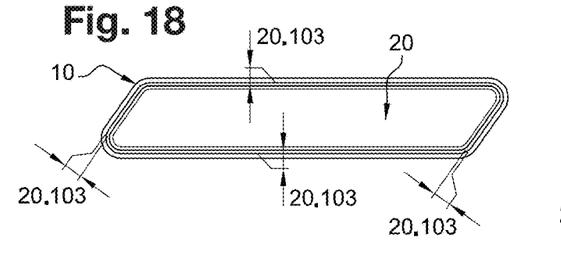
FIG. 18 is a front view illustrating the result of the assembly method illustrated in FIGS. 12 to 17.

As shown in FIG. 18, thanks to the centering elements 26, the clearances 20.103 between the positioning member 20 and the peripheral component 103 herein are distributed along the perimeter of the opening 18, which gives an aesthetic aspect to this portion of the motor vehicle.

Indeed, in order to obtain the best aspect possible, the automobile manufacturer generally desires distributing the clearances in a constant manner between two opposite edges of the opening 18, in particular in order to avoid a parallelism defect (called «pool cue» clearances) between the edges of the central component 102 and the edges of the opening 18.

Figure 19:
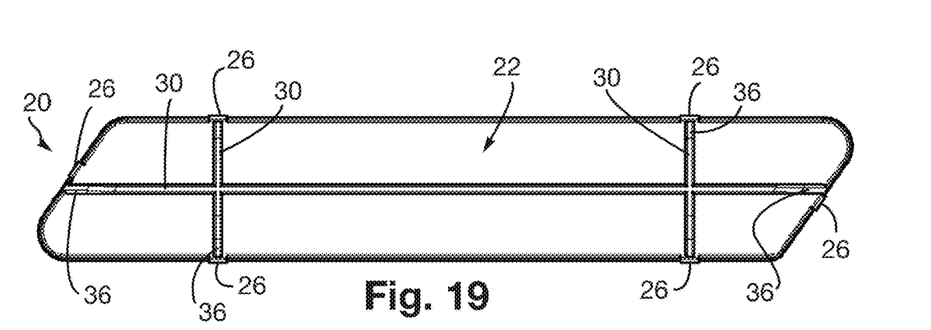
FIG. 19 is a front view of the outer side of a positioning member belonging to an automotive equipment in accordance with a second embodiment of the invention.
Figure 20:
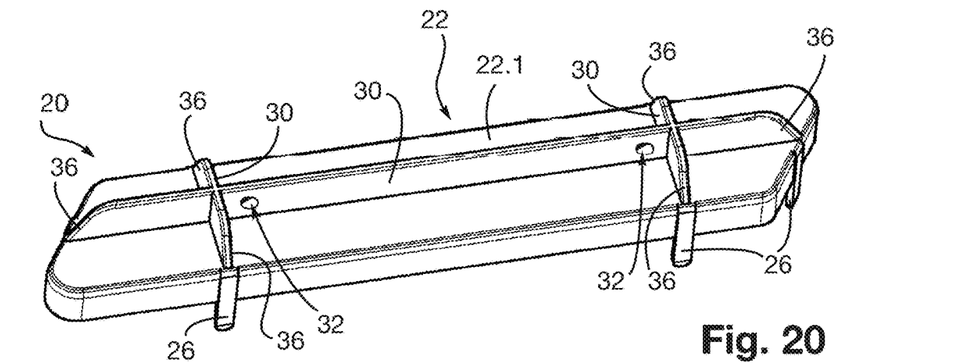
FIG. 20 is a perspective view of the positioning member of FIG. 19.
Figure 21:
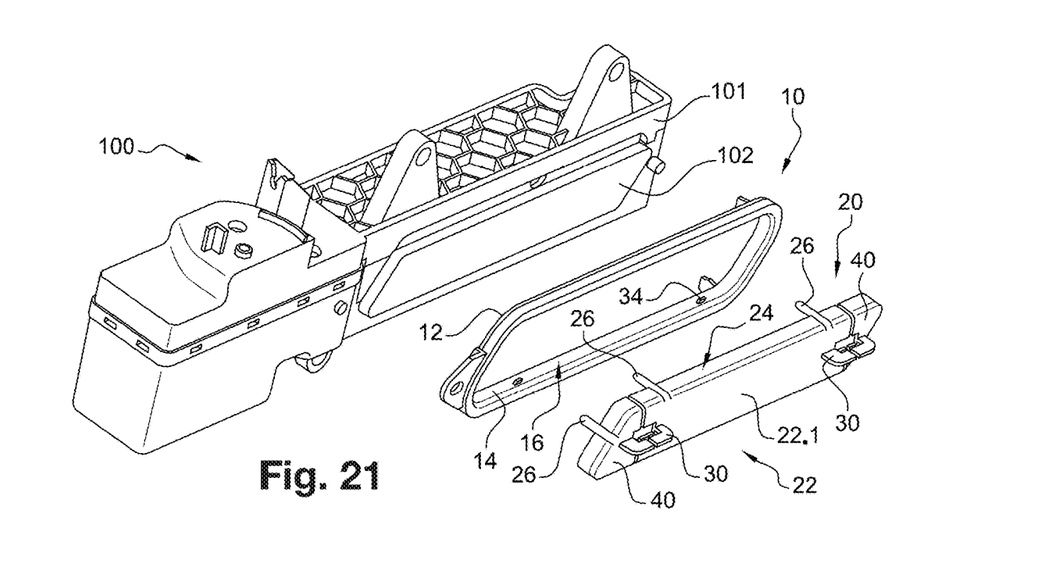
FIG. 21 is an exploded perspective view of an automotive equipment in accordance with a third embodiment of the invention.
Figures 22, 23:
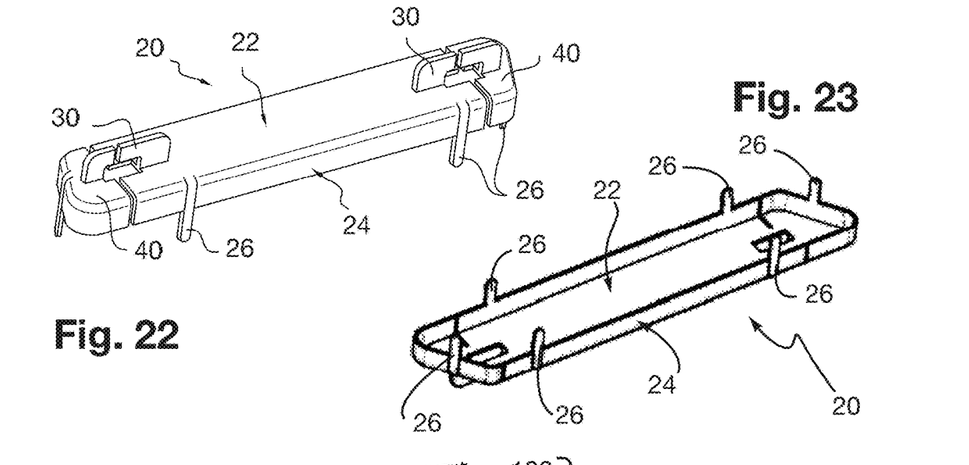
FIG. 22 is a perspective view of the outer side of a positioning member belonging to the automotive equipment of FIG. 21.
FIG. 23 is a perspective view of the inner side of the positioning member of FIG. 21.
Figures 24, 25, 26:
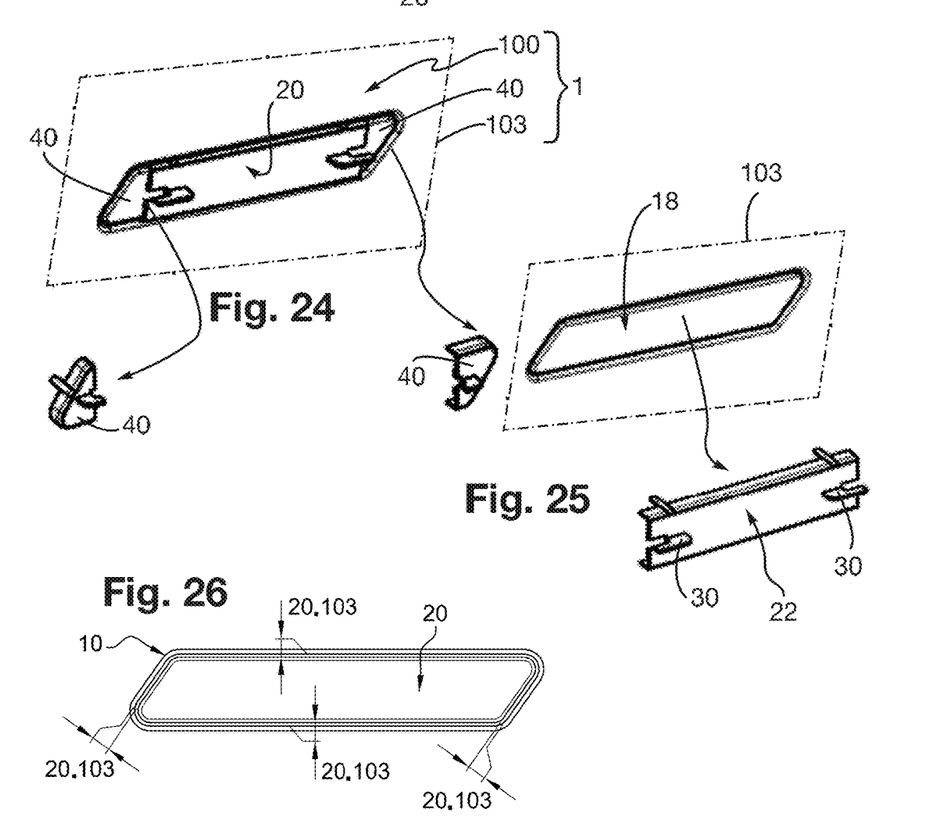
FIG. 24 is a perspective view of the automotive equipment of FIG. 21, for illustrating a step of the assembly method.
FIG. 25 is a perspective view illustrating a subsequent step of the assembly method illustrated in FIG. 24.
FIG. 26 is a front view illustrating the result of the assembly method illustrated in FIGS. 24 to 25.

FIGS. 19 and 20 illustrate a portion of a positioning member 20 composing an automotive equipment 100 in accordance with a second embodiment of the invention. To the extent that the automotive equipment 100 of FIGS. 19 and 20 is similar to the automotive equipment 100 of FIGS. 1 to 18, the description of the automotive equipment 100 given hereinabove in relation to FIGS. 1 to 18 may be transposed to the automotive equipment 100 of FIGS. 19 and 20, with the exception of the notable differences set out hereinafter.

The automotive equipment 100 of FIGS. 19 and 20 differs from the automotive equipment 100 of FIGS. 1 to 18, in particular because the pulling member 30 has two pulling orifices 32 which are intended to receive pulling tools, for example hooks.

In addition, the automotive equipment 100 of FIGS. 19 and 20 differs from the automotive equipment 100 of FIGS. 1 to 18, in particular because the positioning member 20 comprises guide members 36.

Each guide member 36 has a shape inclined towards the outer perimeter 24 so that the guide members 36 have substantially converging shapes. Each guide member 36 extends substantially up to the outer perimeter 24.

The guide members 36 herein are disposed on the covering portion 22 of the positioning member 20. Each guide member 36 extends up to a respective edge of the covering portion 22. As shown in FIG. 20, the guide members 36 have inclined or oblique shapes which converge towards a distant area of the covering portion 22.

Thus, the guide members 36 allow facilitating the introduction of the positioning member 20 in the opening 18 when the automotive equipment 100 is mounted on the peripheral component 103, because the converging shapes guide the positioning member 20 by sliding against the perimeter of the opening 18. Thus, the guide members 36 facilitate the introduction of the central component 102 in the opening 18.

In addition, the guide members 36 herein avoid errors when referencing the central component 102, along the lateral axis Y of the motor vehicle, on the end of the flanged edge 103.12, instead of the inner face of the peripheral component 103. In other words, the guide members 36 achieve a foolproofing function when referencing along the lateral axis Y visible in FIGS. 9, 10 and 11.

Indeed, when mounting the automotive equipment 100 on the automotive set 1, as illustrated in FIG. 15, the operator carries out, blindly, a tilting motion of the body 104 so as to engage two threaded rods. During this mounting, the guide members 36 facilitate positioning and referencing the automotive equipment 100 with respect to the edges of the opening 18 and along the lateral axis Y and the other axes (X and Z) of the motor vehicle.

However, the clearance along the lateral axis Y is relatively large because of the wide tolerance of manufacture of a reinforcement serving to fasten the body 104. Without the foolproof allowed by the guide members 36, the operator might position the body 104 bearing against the flanged edge 103.12 of the opening 18, instead of referencing the body 104 on the inner face of the peripheral component 103 (door panel), which would leave an unsightly gap between the body 104 and the inner face of the peripheral component 103.

On the contrary, since the pulling members 30 are relatively large along the lateral axis Y and since the pulling members 30 have guide members 36 which are oblique (chamfers), then the body 104 can be engaged systematically and without error in the opening 18 by bearing automatically against the inner face of the peripheral component 103.

FIGS. 21 to 26 illustrate a portion of an automotive equipment 100 in accordance with a third embodiment of the invention. To the extent that the automotive equipment 100 of FIGS. 21 to 26 is similar to the automotive equipment 100 of FIGS. 1 to 18, the description of the automotive equipment 100 given hereinabove in relation to FIGS. 1 to 18 may be transposed to the automotive equipment 100 of FIGS. 21 to 26, with the exception of the notable differences set out hereinafter.

The automotive equipment 100 of FIGS. 21 to 26 differs from the automotive equipment 100 of FIGS. 1 to 18, in particular because the positioning member 20 has two breakable portions 40. The breakable portions 40 herein are arranged on two opposite sides of the positioning member 20.

The breakable portions 40 are intended to be cut manually or with a cutting tool. After being cut, the breakable portions 40 clear an access to the central component 102 and their removal reduces the frictions of the positioning member 20 on the perimeter of the opening 18, which partially frees the mobility of the central component 102 relative to the peripheral component 103.

Thus, the breakable portions 40 allow accessing the central component 102 in order to enable maneuvers of the door external opening control 104 and mounting operations on the motor vehicle, while protecting the central component 102 until the presentation of the motor vehicle to the final customer. The rest of the positioning member 20, with the exception of the breakable portions 40, continues protecting the central component 102 until detachment of the positioning member 20.

Of course, the present invention is not limited to the particular embodiments described in the present patent application, nor is it limited to embodiments within the reach of those skilled in the art. Other embodiments may be considered without departing from the scope of the invention, from any element equivalent to an element indicated in the present patent application.

The invention claimed is:

1. An automotive equipment, for equipping an automotive set which includes a peripheral component defining an opening, the automotive equipment comprising at least:
   a central component intended to close at least partially the opening with a peripheral clearance between the central component and the peripheral component,
   a positioning member having an outer perimeter and centering elements arranged on the outer perimeter, the positioning member being configured to be removably linked to the central component,
   the positioning member being arranged so that the centering elements extend at least partially in projection with respect to the central component,
   each centering element being deformable so that the centering elements can cooperate with edges of the opening so as to center the central component with respect to the opening.

2. The automotive equipment according to claim 1, wherein each centering element has a thickness strictly larger than 100% of a predetermined minimum peripheral clearance between the central component and the opening.

3. The automotive equipment according to claim 1, wherein the centering elements comprise at least one elastically deformable centering element.

4. The automotive equipment according to claim 1, wherein the centering elements are selected in the group constituted of beads, blades, legs and corrugations.

5. The automotive equipment according to claim 1, wherein the centering elements comprise at least one slightly deformable abutment which is arranged so that the peripheral clearance between the central component and the peripheral component is larger than a predetermined minimum clearance.

6. The automotive equipment according to claim 1, wherein at least one part of the centering elements comprises holding portions configured to removably link the positioning member to the central component.

7. The automotive equipment according to claim 1, wherein the positioning member comprises at least one pulling member configured to enable pulling the positioning member.

8. The automotive equipment according to claim 7, wherein the pulling member has at least one pulling orifice intended to receive a pulling tool.

9. The automotive equipment according to claim 1, wherein the positioning member comprises guide members, each guide member having a shape inclined towards the outer perimeter so that the guide members have substantially converging shapes, each guide member extending substantially up to the outer perimeter.

10. The automotive equipment according to claim 1, further comprising a gasket, at least one of the centering elements being configured to cooperate with an inner edge of the gasket so as to center the gasket with respect to the central component.

11. The automotive equipment according to claim 10, wherein the gasket comprises a rigid portion and a flexible portion, the flexible portion defining an inner edge of the gasket, the gasket being configured to surround at least partially the central component, at least one centering element being configured to cooperate with the inner edge of the gasket so as to center the gasket with respect to the central component.

12. The automotive equipment according to claim 1, wherein the positioning member comprises a covering portion configured to cover at least one peripheral portion of the central component.

13. The automotive equipment according to claim 12, wherein the covering portion comprises a planar covering portion, and wherein at least one portion of said centering elements extends in projection transversely to the planar covering portion.

14. The automotive equipment according to claim 12, wherein the covering portion is arranged so as to completely cover the opening.

15. The automotive equipment according to claim 12, wherein the covering portion is arranged so as to partially cover the opening, the positioning member presenting a window configured to allow an external observer to see a portion of the central component through the window.

16. The automotive equipment according to claim 12, wherein the covering portion is translucent or transparent.

17. The automotive equipment according to claim 1, wherein the positioning member has at least one breakable portion intended to be cut so as to clear an access to the central component.

18. The automotive equipment according to claim 1, further comprising a body, the body being configured for the gripping of the automotive equipment by an operator.

19. An automotive set, for composing a motor vehicle, the automotive set including a peripheral component defining an opening, the automotive set further including at least one automotive equipment according to claim 1, the automotive equipment being mounted on the peripheral component, the central component closing at least partially the opening with a peripheral clearance between the central component and the peripheral component, the centering elements cooperating with edges of the opening so as to center the central component with respect to the opening.

* * * * *